United States Patent
Coronado et al.

(10) Patent No.: US 10,204,021 B2
(45) Date of Patent: *Feb. 12, 2019

(54) RECOVERY OF AN INFECTED AND QUARANTINED FILE IN A PRIMARY STORAGE CONTROLLER FROM A SECONDARY STORAGE CONTROLLER

(71) Applicant: INTERNATIONAL BUSINESS MACHINES CORPORATION, Armonk, NY (US)

(72) Inventors: Sara M. Coronado, Tucson, AZ (US); Juan A. Coronado, Tucson, AZ (US); Christina A. Lara, Tucson, AZ (US); Lisa R. Martinez, Escondido, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/828,127

(22) Filed: Nov. 30, 2017

(65) Prior Publication Data

US 2018/0089039 A1 Mar. 29, 2018

Related U.S. Application Data

(63) Continuation of application No. 14/248,266, filed on Apr. 8, 2014, now Pat. No. 9,898,374.

(51) Int. Cl.
*G06F 21/56* (2013.01)
*G06F 11/20* (2006.01)
*G06F 11/14* (2006.01)

(52) U.S. Cl.
CPC ...... *G06F 11/1469* (2013.01); *G06F 11/1451* (2013.01); *G06F 11/2058* (2013.01);
(Continued)

(58) Field of Classification Search
CPC ............. G06F 11/1469; G06F 11/2069; G06F 11/2058; G06F 11/1451; G06F 21/568; G06F 2201/84; G06F 2201/855
(Continued)

(56) References Cited

U.S. PATENT DOCUMENTS

| 7,523,487 B2 | 4/2009 | Muhlestein |
| 7,774,391 B1 | 8/2010 | Le et al. |

(Continued)

FOREIGN PATENT DOCUMENTS

| JP | 2007102697 A | 4/2007 |
| JP | 2009087023 A | 4/2009 |
| JP | 2009110225 A | 5/2009 |

OTHER PUBLICATIONS

Y. Miretskiy, "An On-Access Anti-Virus File System", Stony Brook University, Appears in the proceedings of the 13th USENIX Security Symposium, 2004, pp. 16.
(Continued)

*Primary Examiner* — Michael S McNally
(74) *Attorney, Agent, or Firm* — Rabindranath Dutta; Konrad Raynes Davda & Victor LLP

(57) ABSTRACT

A primary storage controller determines that a quarantined area of the primary storage controller cannot be repaired, wherein the quarantined area is infected with a virus. A query is sent to a secondary storage controller to determine whether the secondary storage controller has data that is free of virus in an area of the secondary storage controller corresponding to the quarantined area of the primary storage controller. In response to receiving a notification that the secondary storage controller has data that is free of virus, the primary storage controller is repaired to remove the virus.

18 Claims, 11 Drawing Sheets

(52) U.S. Cl.
CPC ........ *G06F 11/2069* (2013.01); *G06F 21/568* (2013.01); *G06F 2201/84* (2013.01); *G06F 2201/855* (2013.01)

(58) Field of Classification Search
USPC .......................................................... 726/24
See application file for complete search history.

(56) References Cited

U.S. PATENT DOCUMENTS

| | | | |
|---|---|---|---|
| 7,962,956 | B1 | 6/2011 | Liao et al. |
| 9,280,296 | B2 * | 3/2016 | Crawford ................ G06F 3/065 |
| 9,557,924 | B2 | 1/2017 | Coronado et al. |
| 2002/0194212 | A1 | 12/2002 | Grupe |
| 2003/0191957 | A1 | 10/2003 | Hypponen et al. |
| 2004/0010732 | A1 | 1/2004 | Oka |
| 2004/0158741 | A1 | 8/2004 | Schneider |
| 2005/0149749 | A1 | 7/2005 | Van Brabant |
| 2006/0005048 | A1 * | 1/2006 | Osaki ................. G06F 11/1464 713/193 |
| 2006/0047929 | A1 | 3/2006 | Otani et al. |
| 2006/0137013 | A1 | 6/2006 | Lok |
| 2008/0047013 | A1 | 2/2008 | Claudatos et al. |
| 2009/0089880 | A1 | 4/2009 | Kobayashi et al. |
| 2009/0113151 | A1 | 4/2009 | Teranishi et al. |
| 2010/0235916 | A1 * | 9/2010 | Radatti ................. G06F 21/56 726/24 |
| 2011/0153571 | A1 | 6/2011 | Walker et al. |
| 2011/0197279 | A1 | 8/2011 | Ueoka |
| 2011/0231934 | A1 | 9/2011 | Davis et al. |
| 2012/0011361 | A1 | 1/2012 | Guerrero et al. |
| 2012/0030766 | A1 | 2/2012 | Tarbotton et al. |
| 2013/0179972 | A1 | 7/2013 | Coronado et al. |
| 2014/0007239 | A1 | 1/2014 | Sharpe et al. |
| 2014/0059687 | A1 | 2/2014 | Coronado et al. |
| 2015/0286437 | A1 | 10/2015 | Coronado et al. |
| 2015/0286530 | A1 | 10/2015 | Coronado et al. |

OTHER PUBLICATIONS

J. Dickenson, "How to Use Multilayered Security to Defeat Viruses", The New Anti-Virus Formula, Copyright 2005 IronPort Systems, Inc., pp. 19.
U.S. Appl. No. 14/248,265, filed Apr. 8, 2014.
Office Action dated May 20, 2016, pp. 18, for U.S. Appl. No. 14/248,265, filed Apr. 8, 2014.
Response dated Aug. 20, 2016, pp. 15, to Office Action dated May 20, 2016, pp. 18, for U.S. Appl. No. 14/248,265, filed Apr. 8, 2014.
Notice of Allowance dated Sep. 19, 2016, pp. 11, for U.S. Appl. No. 14/248,265, filed Apr. 8, 2014.
U.S. Appl. No. 14/248,266, filed Apr. 8, 2014.
Office Action dated Dec. 23, 2015, 2015, pp. 20, for U.S. Appl. No. 14/248,266, filed Apr. 8, 2014.
Response dated Mar. 23, 2016, pp. 14, to Office Action dated Dec. 23, 2015, 2015, pp. 20, for U.S. Appl. No. 14/248,266, filed Apr. 8, 2014.
Final Office Action dated Jul. 22, 2016, pp. 22, for U.S. Appl. No. 14/248,266, filed Apr. 8, 2014.
Response dated Oct. 24, 2016, pp. 16, to Final Office Action dated Jul. 22, 2016, pp. 22, for U.S. Appl. No. 14/248,266, filed Apr. 8, 2014.
Notice of Allowance dated Oct. 11, 2017, pp. 22, for U.S. Appl. No. 14/248,266, filed Apr. 8, 2014.
List of IBM Patents or Patent Applications Treated as Related, dated Nov. 30, 2017, Total 2 pages.

* cited by examiner

RECOVERY OF AN INFECTED AND QUARANTINED FILE IN A PRIMARY STORAGE CONTROLLER FROM A SECONDARY STORAGE CONTROLLER

CROSS-REFERENCE TO RELATED APPLICATION

This application is a continuation of U.S. patent application Ser. No. 14/248,266, filed Apr. 8, 2014, which application is incorporated herein by reference in its entirety.

BACKGROUND

1. Field

Embodiments relate to the recovery of an infected and quarantined file in a primary storage controller from a secondary storage controller.

2. Background

In certain storage systems, a primary storage controller that provides input/output (I/O) access to files may be coupled to a secondary storage controller. The primary storage controller and the secondary storage controller may include computational devices and/or storage devices. The secondary storage controller may store backup copies of files stored on the primary storage controller. The backup copies may be generated asynchronously by copying files from the primary storage controller to the secondary storage controller. While asynchronous copy operations are in progress, the primary storage controller may continue to respond to input/output (I/O) requests that are received from a host or other computational devices.

A virus is a piece of code that may be maliciously introduced into a computer system to have a detrimental effect, such as a corruption in the computer system or a destruction of data stored in the computer system. Anti-virus protection is desirable in storage systems in order to ensure data integrity and data protection. In certain situations, an anti-virus application may execute in the primary storage controller. During the execution of the anti-virus application any virus that may have infected the files controlled by the primary storage controller are identified and such viruses may be quarantined or removed.

SUMMARY OF THE PREFERRED EMBODIMENTS

Provided are a method, a system, and a computer program product in which a primary storage controller determines that a quarantined area of the primary storage controller cannot be repaired, wherein the quarantined area is infected with a virus. A query is sent to a secondary storage controller to determine whether the secondary storage controller has data that is free of virus in an area of the secondary storage controller corresponding to the quarantined area of the primary storage controller. In response to receiving a notification that the secondary storage controller has data that is free of virus, the primary storage controller is repaired to remove the virus.

In certain embodiments, the primary storage controller is repaired to remove the virus by overwriting the quarantined area with data recovered from the secondary storage controller. A host is requested to resend data updates if data between the primary storage controller and the secondary storage controller are not in synchronization but are still consistent on the secondary storage controller.

In additional embodiments, the primary storage controller is repaired to remove the virus by writing data recovered from the secondary storage controller into a new area of the primary storage controller and generating metadata updates to integrate the new area with an existing file, where the existing file is comprised of subfiles. A host is requested to resend data updates if data between the primary storage controller and the secondary storage controller are not in synchronization but are still consistent on the secondary storage controller.

In additional embodiments, the primary storage controller maintains metadata comprising location of the quarantined area, and an indicator to indicate that the quarantined area has been recently repaired, wherein the quarantined area is recently repaired if it has been repaired within a predetermined period of time.

In further embodiments, the query is sent to the secondary storage controller if the quarantined area has not been recently repaired to avoid repeated queries of the secondary storage controller.

In additional embodiments, the metadata further comprises additional indicators indicating a number of times the quarantined area has been infected and a history of infections of the quarantined area, wherein based at least on the additional indicators the primary storage controller determines which hosts, applications or users are causing repeated problems with viruses.

In certain embodiments, the primary storage controller and the secondary storage are part of a storage system. The primary storage controller controls storage devices and allows one or more computational devices to perform I/O operations with respect to the storage devices. The secondary storage controller stores backup copies of data stored in the primary storage controller.

BRIEF DESCRIPTION OF THE DRAWINGS

Referring now to the drawings in which like reference numbers represent corresponding parts throughout.

DETAILED DESCRIPTION

Figure 1:
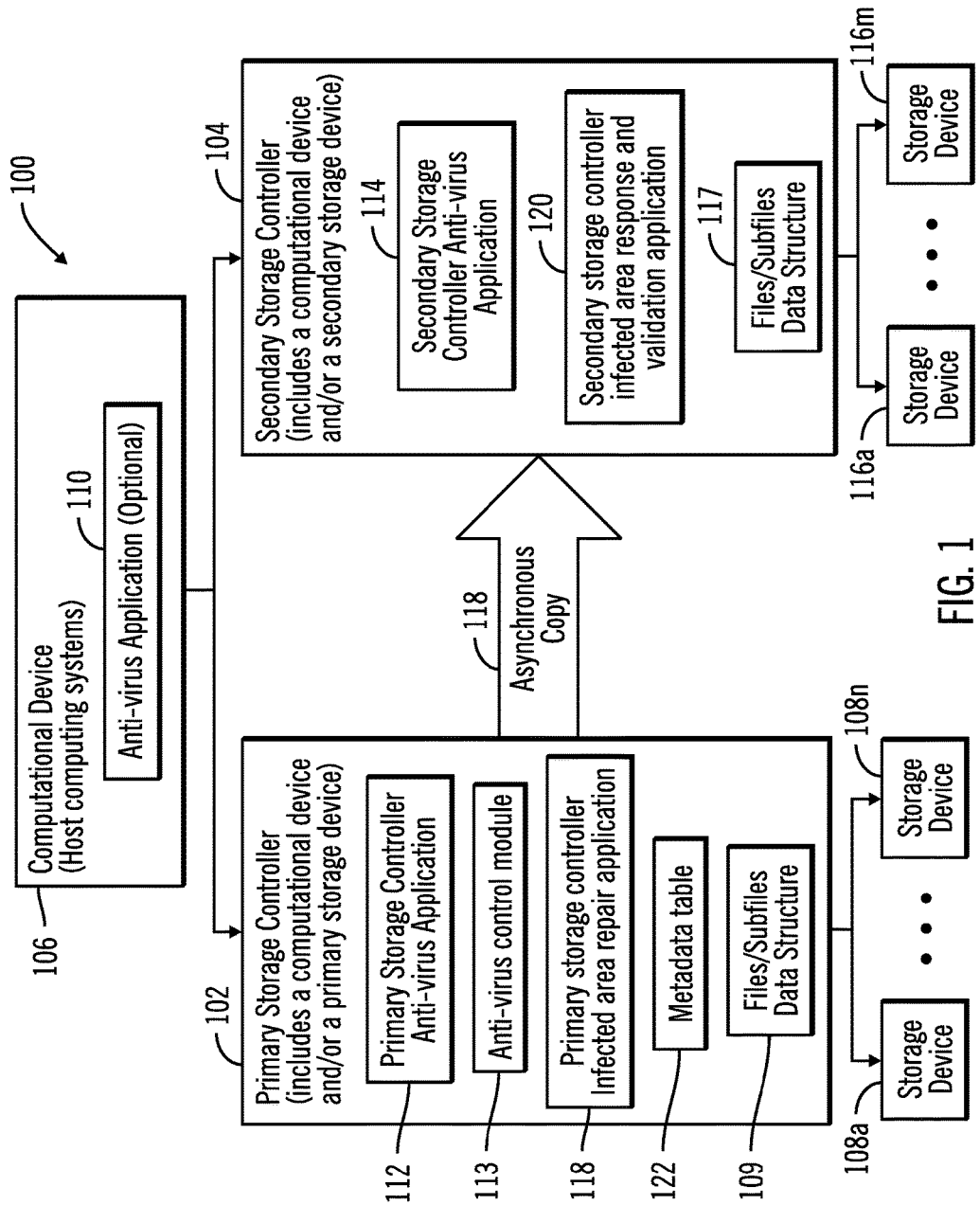
FIG. 1 illustrates a block diagram of a computing environment comprising a primary and secondary storage controller, in accordance with certain embodiments.

In the following description, reference is made to the accompanying drawings which form a part hereof and which illustrate several embodiments. It is understood that other embodiments may be utilized and structural and operational changes may be made.

Running Anti-virus Application on Secondary Storage Controller

The primary storage controller is expected to respond to I/O requests that attempt to access storage controlled by the primary storage controller. However, once an anti-virus scan starts executing in the primary storage controller it is expected to run to completion and this may be a very time consuming process. During this anti-virus scanning process the files being scanned may be marked read-only and as a result write I/O on such files may be delayed.

In certain mechanisms, asynchronous replication is employed to create and maintain secondary copies of data in a secondary storage controller. The secondary storage controller may have minimal direct user access and may function mainly as a target or secondary machine that processes write updates sent from the primary storage controller. This allows for spare processing cycles on the secondary storage controller.

In certain mechanisms anti-virus scan related requests are sent to the secondary storage controller. By transferring the anti-virus scan request to the secondary storage controller the primary storage controller is freed to service I/O requests while the anti-virus scan is in progress in the secondary storage controller.

Recovery of Infected Data in Primary Storage Controller

Certain embodiments provide mechanisms for recovering data infected with a virus in a primary storage controller, based on recovery of the data from a secondary storage controller that asynchronously copies data from the primary storage controller and runs its own anti-virus application on the asynchronously copied data.

Certain embodiments use files or subfiles (a plurality of subfiles together comprise a file), and are able to quarantine individual files or subfiles versus the entire file system. In certain embodiments, if a file or subfile cannot be repaired and there is a secondary storage controller which is the target of an asynchronous replication, in an effort to avoid data loss, the file or subfile may be recovered automatically from the secondary as long as the virus has not infected the secondary copy and the file or subfiles is consistent.

If the infected area is repaired on the primary with the data from the secondary then the file or subfile will no longer be in a quarantined state. As a result the primary can request updates from the host or application with respect to the data that was repaired. Therefore, the file or subfile is now available for I/O.

In certain embodiments, if data is utilized from the secondary storage controller, the writing of the recovered data may occur either by overwriting of a quarantined area or by writing the recovered data on a new area of storage. In certain embodiments, the recovered data from the secondary storage controller is overwritten on the quarantined area on the primary storage controller. In other embodiments, the recovered data is written on a new area of disk and all the necessary metadata updates are made to integrate the new area with the existing file or subfile.

Exemplary Embodiments

FIG. 1 illustrates a block diagram of a computing environment 100 comprising a primary storage controller 102 and a secondary storage controller 104, in accordance with certain embodiments. The primary storage controller 102 and the secondary storage controller 104 may be communicatively coupled to each other and to one or more computational devices 106, such as host computing systems. The host computing system 106 may generate I/O requests for the primary storage controller 102 to access data controlled by the primary storage controller 102 and stored in one or more storage devices 108*a* . . . 108*n*. The primary storage controller 102 may represent the data stored in the storage devices 108*a* . . . 108*n* in files or subfiles (as shown by the Files/Subfiles data structure 109) where a subfile is a portion of a file and a plurality of subfiles may comprise a file.

The primary storage controller 102, the secondary storage controller 104, and the computational device 106 may comprise any suitable computational device including those presently known in the art, such as, a personal computer, a workstation, a server, a mainframe, a hand held computer, a palm top computer, a telephony device, a network appliance, a blade computer, a server, a processing device, etc. The computational device 106 and the storage controllers 102, 104 may be elements in any suitable network, such as, a storage area network, a wide area network, the Internet, an intranet. In certain embodiments, the computational device 106 and the storage controllers 102, 104 may be elements in a cloud computing environment.

The primary storage controller 102, the secondary storage controller 104, and the computational device 106 may each include an anti-virus application such as anti-virus applications 110, 112, 114. For the purposes of this disclosure, the anti-virus application 112 that executes on the primary storage controller 102 is referred to as the primary storage controller anti-virus application 112, and the anti-virus application 114 that executes on the secondary storage controller 104 may be referred to as the secondary storage controller anti-virus application 114. In certain alternative embodiments, one or more of the anti-virus application 110, 112, 114 may be optional. For example, in certain embodiments, the anti-virus application 110 may be absent. In other embodiments, initiation of the primary and the secondary storage controller anti-virus applications 112, 114 may be controlled by the anti-virus application 110, and in other embodiments the initiation of the secondary storage controller anti-virus application 114 may be controlled by the primary storage controller anti-virus application 112.

A plurality of storage devices 116*a* . . . 116*m* may store asynchronous copy of data copied to the secondary storage controller 104 from the primary storage controller 102 via an asynchronous copy operation 118. During an asynchronous copy process the primary storage controller 102 may perform I/O operations, whereas during a synchronous copy process the primary storage controller 102 is restricted from performing at least write I/O operations while the synchronous copy process is in progress. The secondary storage controller 104 may represent the data stored in the storage devices 116a . . . 116n as files or subfiles as shown by the files/subfiles data structure 117.

The secondary storage controller 104 stores an asynchronous copy of data and performs anti-virus scan on the asynchronous copy of data and as a result allows the primary storage controller 102 to perform I/O and other operations while the anti-virus scan is in progress. Processing load on the primary storage controller 102 is reduced in comparison to the situations where the anti-virus scan is performed in the primary storage controller 102. Additionally, if the secondary storage controller 104 already stores the asynchronous copy of the data, the file for scanning may not have to be transferred to the secondary storage controller 104 after an anti-virus scan request is received.

In certain embodiments, the primary storage controller 102 may also include an anti-virus control module 113 for distributing anti-virus scanning tasks among a plurality of external computational devices (referred to as anti-virus clients) including the secondary storage controller 104. In many situations in which anti-virus scanning tasks are distributed among external computational devices, the file that is to be scanned for viruses may also have to be transferred.

In certain embodiments, the primary storage controller 102 also includes a primary storage controller infected area repair application 118 and the secondary storage controller 104 may include a secondary storage controller infected are response and validation application 120. The primary storage controller 102 also includes a metadata table 122 that stores metadata (i.e., description of characteristics of data) regarding infected storage areas of the primary storage controller 102, where the infected storage areas comprise those files or subfiles that have been infected with a virus and have been quarantined.

In certain embodiments, the primary storage controller 102 may execute the primary storage controller anti-virus application 112 and determine that certain storage areas of the primary storage controller 102 have been infected with a virus, and then quarantine the infected areas. In certain embodiments the primary storage controller 102 repairs the primary storage controller 102 by retrieving data that is virus-free from the secondary storage controller 104.

Therefore, FIG. 1 illustrates certain embodiments in which the secondary storage controller 104 stores an asynchronous copy of data stored in the primary storage controller 102. In certain embodiments, the primary storage controller 102 may run the primary storage controller anti-virus application 112 and determine that certain storage areas are to be quarantined because they are infected with a virus. The storage areas are repaired by retrieving data that is virus-free from the secondary storage controller 104.

Figure 2:
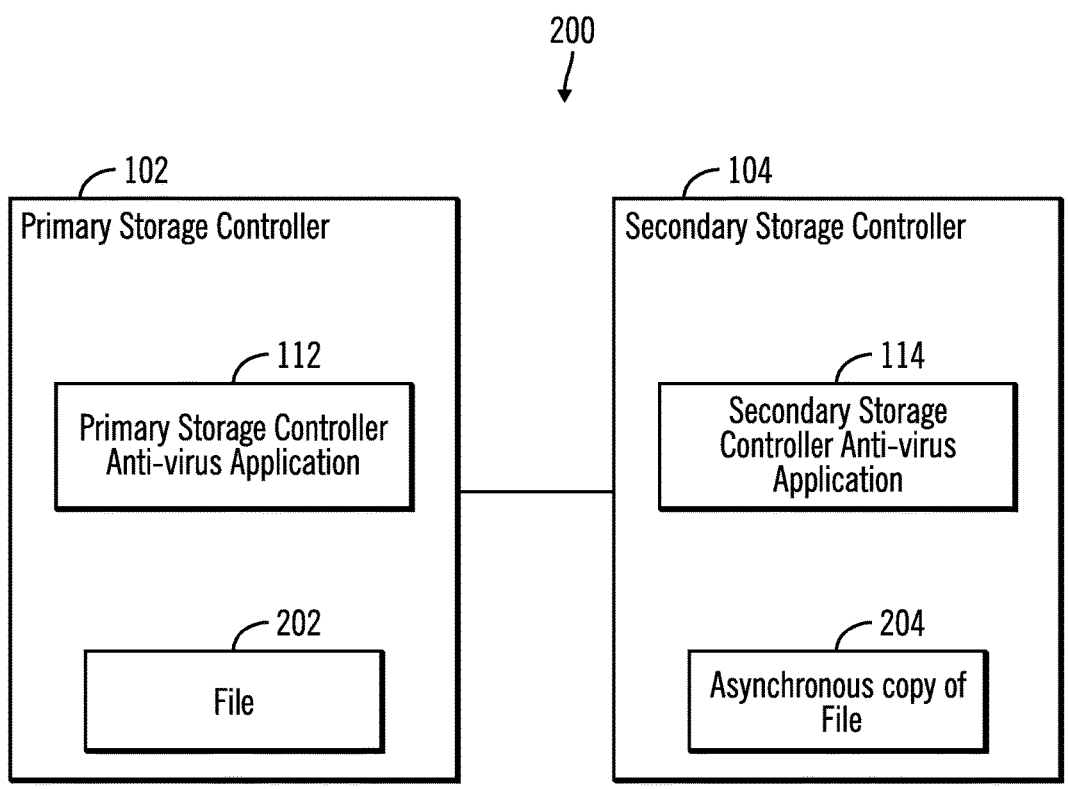
FIG. 2 illustrates a block diagram that shows anti-virus applications and asynchronous copy of files in the secondary storage controller, in accordance with certain embodiments.

FIG. 2 illustrates a block diagram 200 that shows anti-virus applications 112, 114. A file 202 is stored in storage devices controlled by the primary storage controller 102. The secondary storage controller 114 stores an asynchronous copy 204 of file 202 in storage devices controlled by the secondary storage controller 204. The primary storage controller anti-virus application 112 performs a scan for viruses on the file and determines that certain subfiles or the file itself is infected with a virus. The file or subfiles are repaired from the asynchronous copy 204 of the file stored in the secondary storage controller 104.

Figure 3:
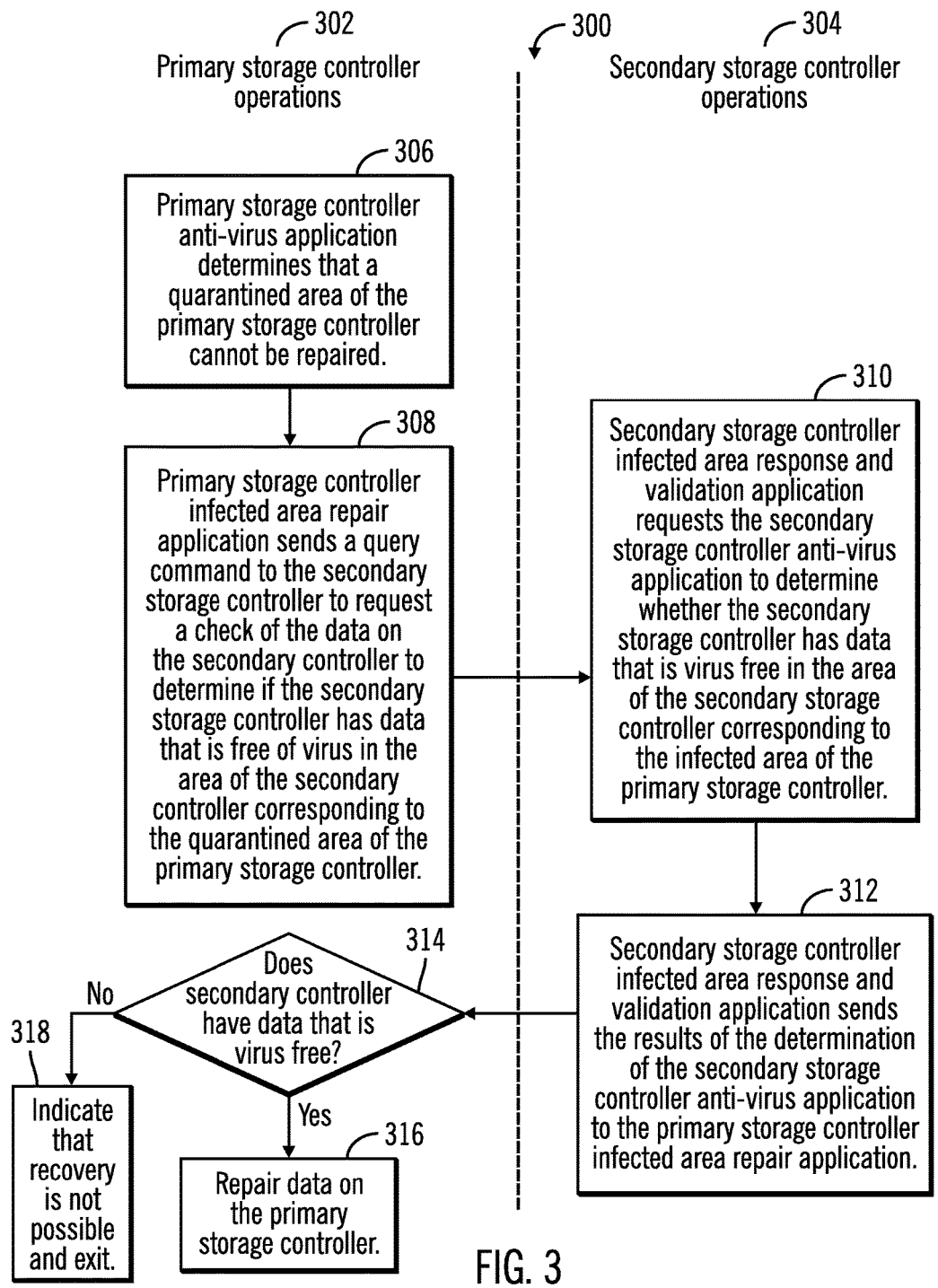
FIG. 3 illustrates a flowchart that shows operations related to repairing data on the primary storage controller based on data received from the secondary storage controller, in accordance with certain embodiments.

FIG. 3 illustrates a flowchart 300 that shows operations related to repairing data on the primary storage controller 102 based on data received from the secondary storage controller 104, in accordance with certain embodiments. The operations shown in FIG. 3 may be performed by one or more applications that execute in the primary 102 and secondary 104 storage controllers, where the operations to the left of the dashed line (reference numeral 302) are performed in the primary storage controller 102 and the operations to the right of the dashed line (reference numeral 304) are performed in the secondary storage controller 104.

Control starts at block 306 in which the primary storage controller anti-virus application 112 determines that a quarantined area of the primary storage controller 102 cannot be repaired, i.e., there is a virus in the file or subfile located in the quarantined area and the file or subfile cannot be repaired to include data that is virus free. The quarantined area is isolated from other storage areas of primary storage controller 102.

Control proceeds to block 308 in which the primary storage controller infected area repair application 118 sends a query command to the secondary storage controller 104 to request a check of the data on the secondary controller 104 to determine if the secondary storage controller 104 has data that is free of virus in the area of the secondary controller 104 corresponding to the quarantined area of the primary storage controller 102.

The secondary storage controller 104 receives the query command, and the secondary storage controller infected area response and validation application 120 requests (at block 310) the secondary storage controller anti-virus application 114 to determine whether the secondary storage controller 104 has data that is virus free in the area of the secondary storage controller 104 corresponding to the infected area of the primary storage controller 102. On receiving the response to the request from the secondary storage controller anti-virus application 114, the secondary storage controller infected area response and validation application 120 sends (at block 312) the results of the determination of the secondary storage controller anti-virus application 114 to the primary storage controller infected area repair application 118.

Control proceeds to block 314, in which the primary storage controller infected area repair application 118 determines from the received results whether the secondary storage controller 104 has data that is virus free. If so, then the primary storage controller infected area repair application 118 repairs (at block 316) the data on the primary storage controller. If not, the primary storage controller infected area repair application 118 sends an indication (at block 318) the user that recovery is not possible and exits the process.

Therefore, FIG. 3 illustrates certain embodiments in which the primary storage controller 102 repairs data on the primary storage controller 102 based on virus-free data received from the secondary storage controller 104.

Figure 4:
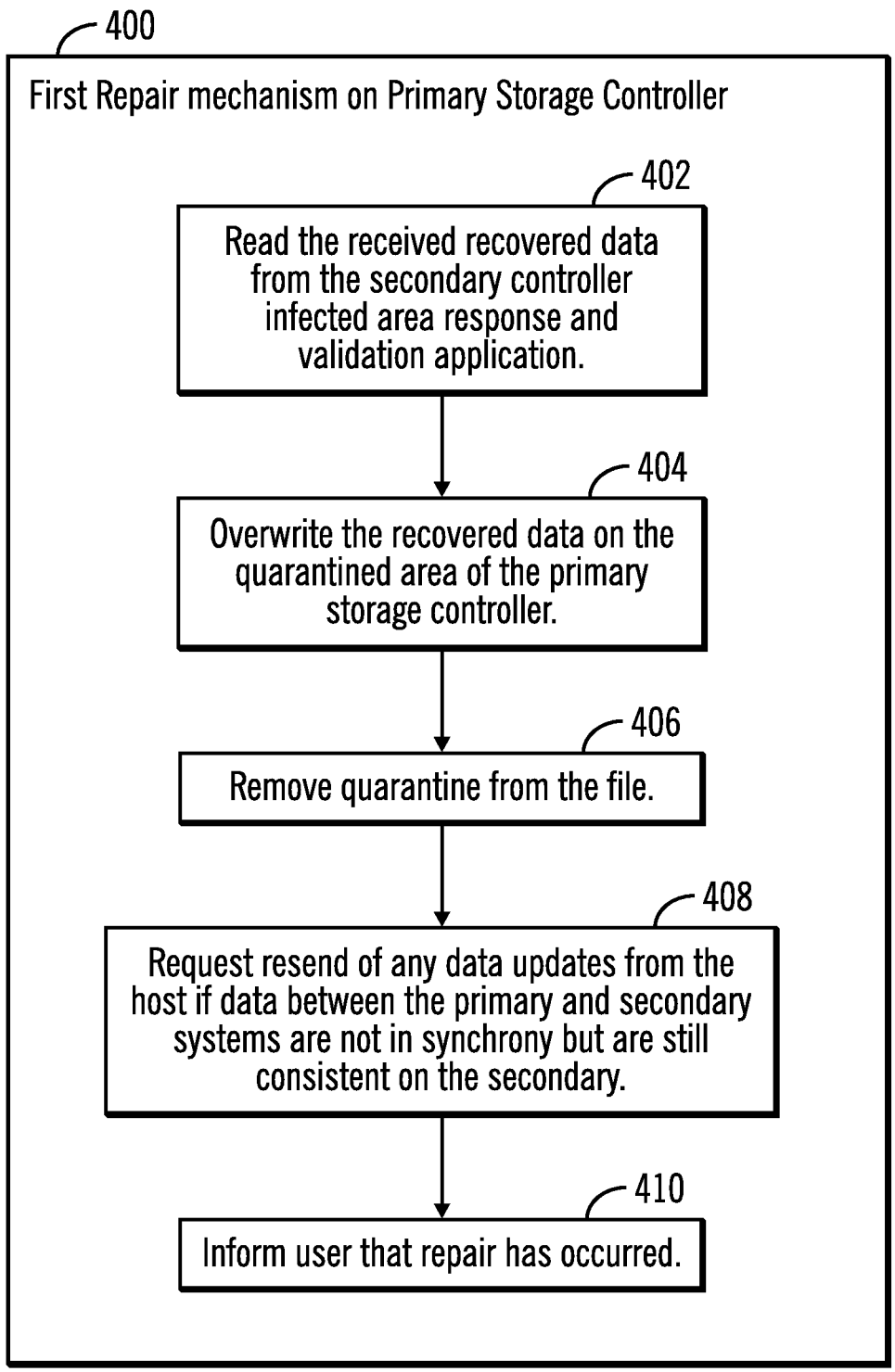
FIG. 4 illustrates a flowchart that shows a first repair mechanism on the primary storage controller performed via overwriting of a quarantined area, in accordance with certain embodiments.

FIG. 4 illustrates a flowchart 400 that shows a first repair mechanism on the primary storage controller 102 performed via overwriting of a quarantined area, in accordance with certain embodiments. The operations shown in FIG. 4 may be performed by one or more applications that execute in the primary storage controller 102.

Control starts at block 400 in which the primary storage controller infected area repair application 118 reads the received recovered data from the secondary controller infected area response and validation application 120. The primary storage controller infected area repair application 118 overwrites (at block 404) the recovered data on the quarantined area of the primary storage controller 102, and removes (at block 406) the quarantine from the file or subfiles that are stored in the quarantined area.

Control proceeds to block 408 in which the primary storage controller infected area repair application 118 requests the resending of any data updates from the host 106 if data between the primary storage controller 102 and the secondary storage controller 104 are not in synchronization but are still consistent on the secondary storage controller 104. For example, updates are requested if the updated data that contained the virus was not yet replicated to the secondary storage controller 104. Control then proceeds to block 410 in which the user is informed that the repair has occurred.

Figure 5:
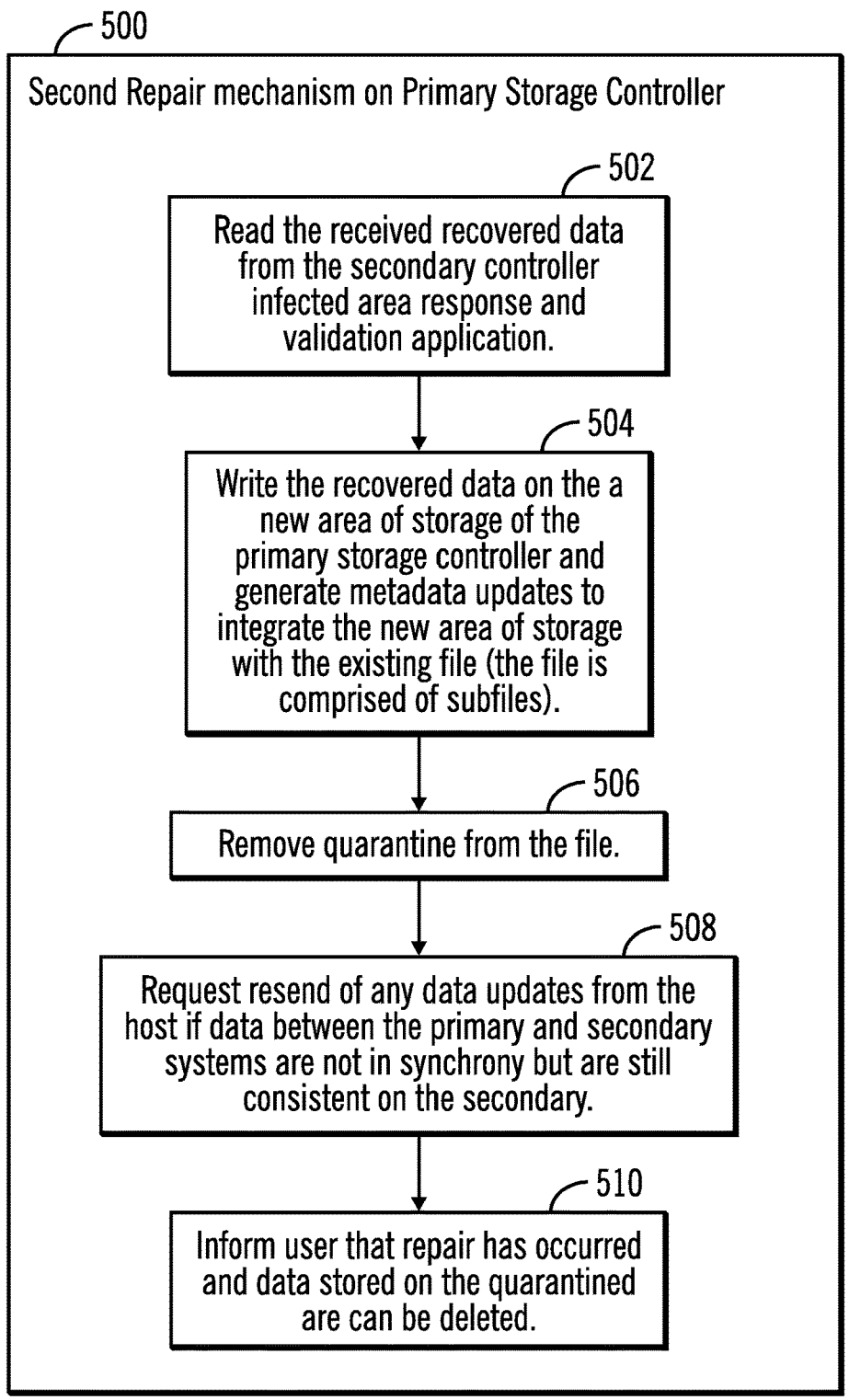
FIG. 5 illustrates a flowchart that shows a second repair mechanism on the primary storage controller performed via writing recovered data is a new area that is different from a quarantined area, in accordance with certain embodiments.

FIG. 5 illustrates a flowchart that shows a second repair mechanism on the primary storage controller 102 performed by writing the recovered data is a new area that is different from a quarantined area, in accordance with certain embodiments. The operations shown in FIG. 5 may be performed by one or more applications that execute in the primary storage controller 102.

Control starts at block 500 in which the primary storage controller infected area repair application 118 reads the received recovered data from the secondary controller infected area response and validation application 120. The primary storage controller infected area repair application 118 writes (at block 504) the recovered data on the a new area of storage of the primary storage controller 102 and generates metadata updates to the metadata table 122 to integrate the new area of storage with the existing files or subfiles, and then removes (at block 506) the quarantine from the file or subfiles that are stored in the quarantined area.

Control proceeds to block 508 in which the primary storage controller infected area repair application 118 requests resend of any data updates from the host 106 if data between the primary storage controller 102 and the secondary storage controller 104 are not in synchronization but are still consistent on the secondary storage controller 104. Control then proceeds to block 510 in which the user is informed that the repair has occurred.

Therefore FIGS. 4 and 5 show certain embodiments to repair the primary storage controller 102 via either replacement of data in the quarantined region or via writing the recovered data in a new region and rearranging the metadata accordingly.

Figure 6:
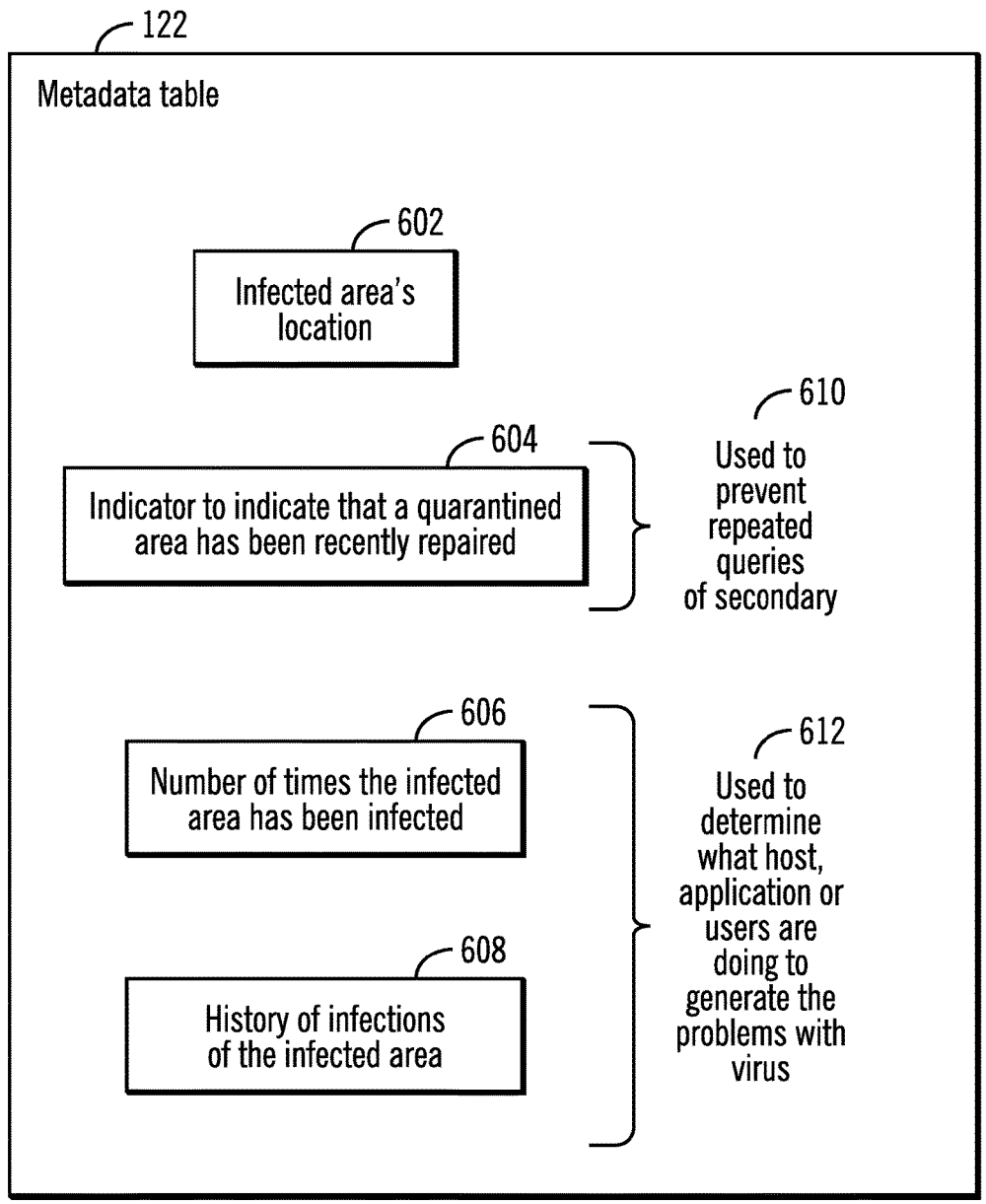
FIG. 6 illustrates a block diagram that shows a metadata table, in accordance with certain embodiments.

FIG. 6 illustrates a block diagram 600 that shows elements included in the metadata table 122 stored in the primary storage controller 102, in accordance with certain embodiments.

The metadata table 122 includes the infected area's location 603 (i.e., the location of the quarantined area). The metadata table 122 also includes an indicator to indicate that a quarantined area has been recently repaired. For example, in certain embodiments if a predetermined time is 5 sec., and if the quarantined area has been repaired in the last 5 sec., then the quarantined area is said to be recently repaired. The indicator 604 is used to prevent repeated queries to the secondary storage controller (shown via reference numeral 610). Therefore, if a virus is repeatedly infecting the primary storage controller 102 in the same storage regions there is little point in making repeated queries to the secondary storage controller 104 for recovering the data.

The metadata table also includes a data structure 606 that indicates the number of times the infected area has been infected and a data structure that stores a record of the history of infections 608 of the infected area. The data structures 606 and 608 are used to determine what host, application or users are causing the virus to be generated repeatedly.

Figure 7:
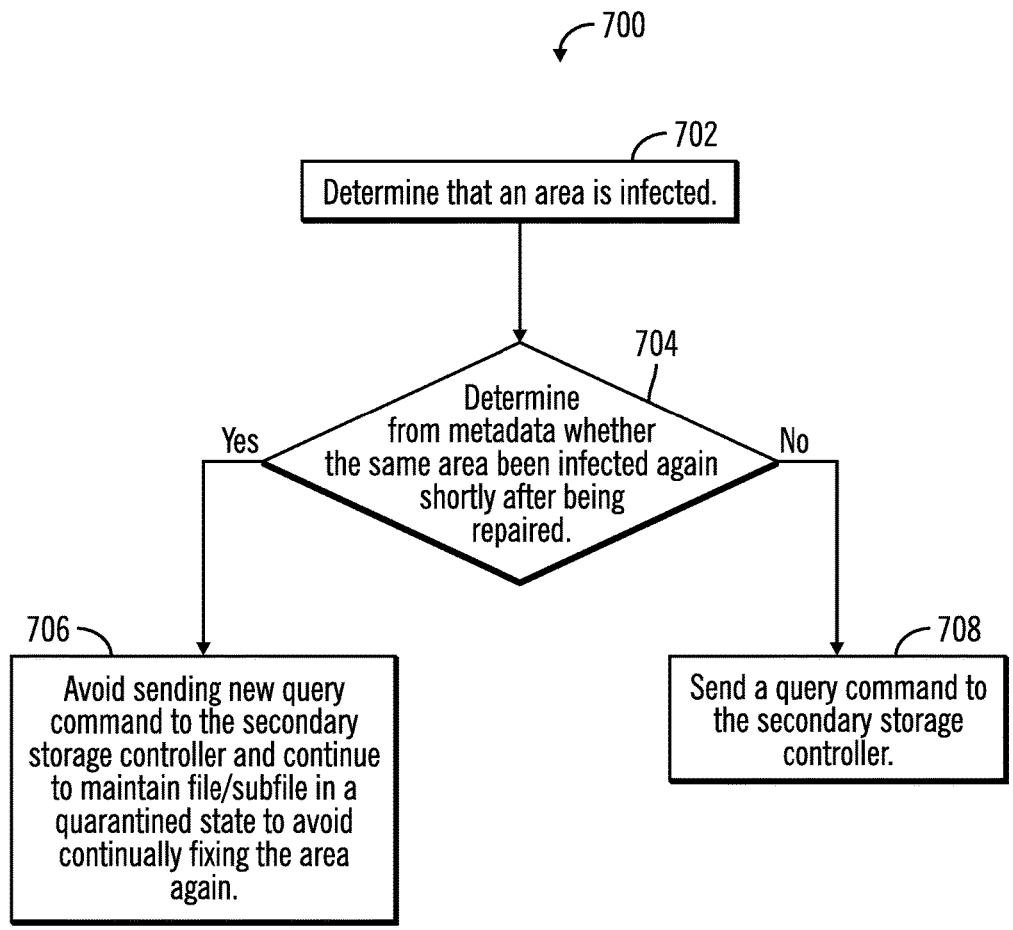
FIG. 7 illustrates a flowchart that shows operations to perform to avoid repeated frequent queries of the secondary storage controller, in accordance with certain embodiments.

FIG. 7 illustrates a flowchart 700 that shows operations to perform to avoid repeated frequent queries of the secondary storage controller 104, in accordance with certain embodiments. The operations shown in FIG. 7 may be performed by one or more applications that execute in the primary storage controller 102.

Control starts at block 702 in which the primary storage controller 102 determines that a storage area is infected with a virus. The primary storage controller infected area repair application 118 determines (at block 704) from the indicator 604 (the indicator 604 when set indicates that a quarantined area has been recently repaired) of the metadata table 122 whether the same area has been infected again shortly after being repaired. If so, then the primary storage controller infected area repair application 118 avoids (at block 706) sending a new query command to the secondary storage controller 104 and continues to maintain the file/subfile in a quarantined state to avoid repeatedly repairing the infected area. If not, then the primary storage controller infected area repair application 118 sends a query command to the secondary storage controller 104 to determine whether virus-free data may be recovered from the secondary storage controller 104.

Therefore FIGS. 6 and 7 illustrate certain embodiments to avoid repeated querying of the secondary storage controller 104 by the primary storage controller 102 to recover virus-free data, when the data is being repeatedly infected with virus again and again within a short interval of time.

Figure 8:
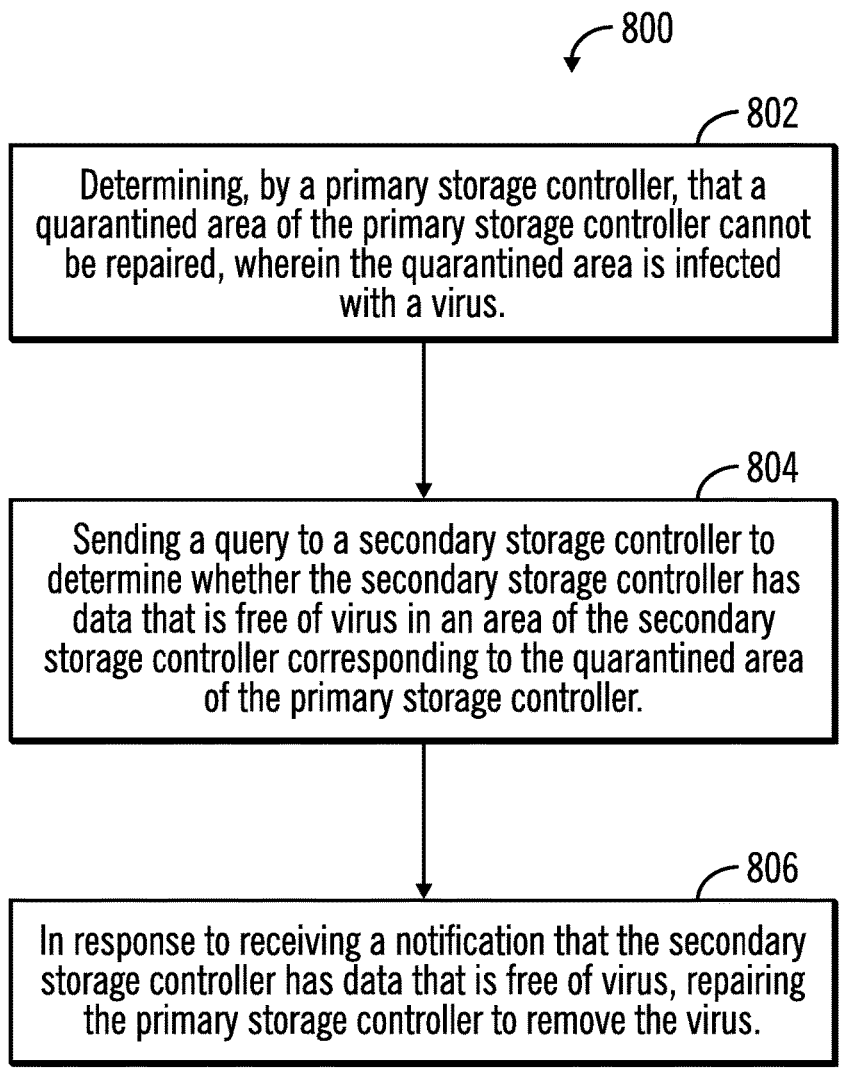
FIG. 8 illustrates a flowchart that shows operations to recover an infected and quarantined file in a primary storage controller from a secondary storage controller, in accordance with certain embodiments.

FIG. 8 illustrates a flowchart 800 that shows operations to recover an infected and quarantined file in a primary storage controller 102 from a secondary storage controller 104, in accordance with certain embodiments. The operations shown in FIG. 8 may be performed by one or more applications that execute in the primary storage controller 102.

Control starts at block 802 in which a primary storage controller 102 determines that a quarantined area of the primary storage controller 102 cannot be repaired, wherein the quarantined area is infected with a virus. A query is sent to a secondary storage controller 104 to determine (at block 804) whether the secondary storage controller 104 has data that is free of virus in an area of the secondary storage controller 104 corresponding to the quarantined area of the primary storage controller 102. In response to receiving a notification that the secondary storage controller has data that is free of virus, the primary storage controller is repaired (at block 806) to remove the virus.

Therefore FIGS. 1-8 illustrate certain embodiments to repair an infected file in a primary storage controller 102 based on recovered data received from a secondary storage controller 104, where the recovered data is virus-free and may have been asynchronously copied to the secondary storage controller 104 from the primary storage controller 102.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 10:
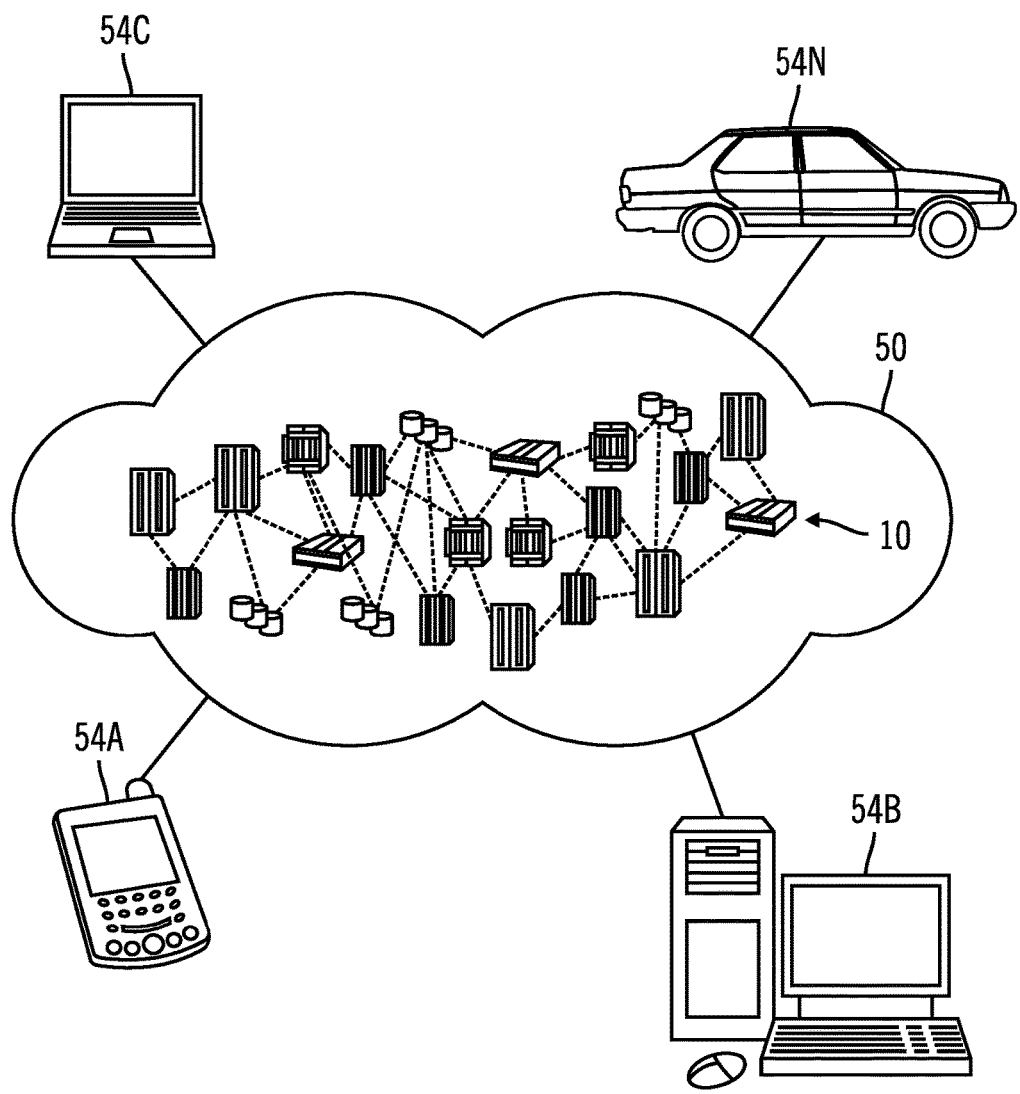
FIG. 10 illustrates a block diagram of a cloud computing environment, in accordance with certain embodiments.

Referring now to FIG. 10, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
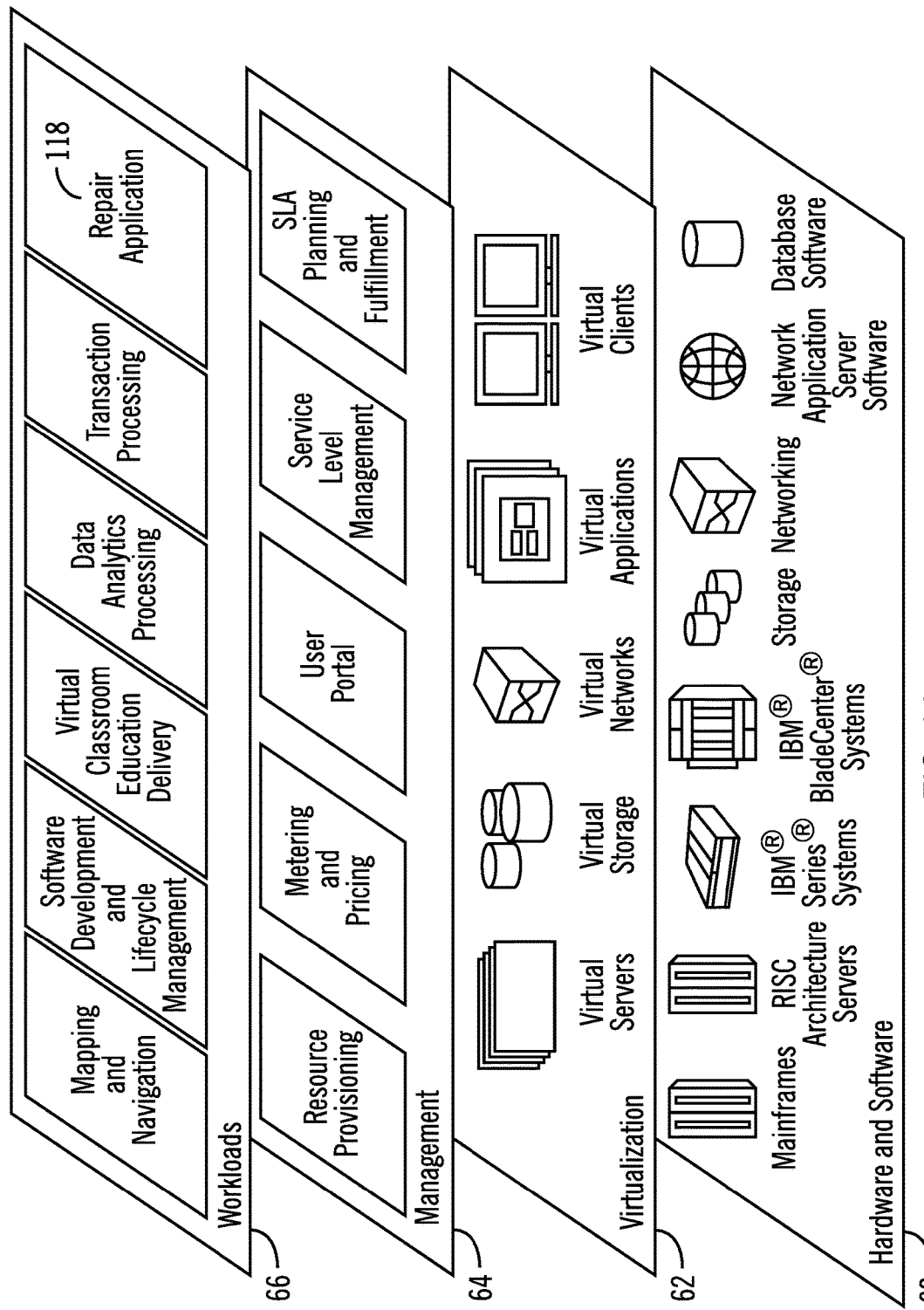
FIG. 11 illustrates a block diagram of further details of the cloud computing environment of FIG. 10, in accordance with certain embodiments.

Referring now to FIG. 11, a set of functional abstraction layers provided by cloud computing environment 50 (FIG. 10) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and primary storage controller infected area repair application 118 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
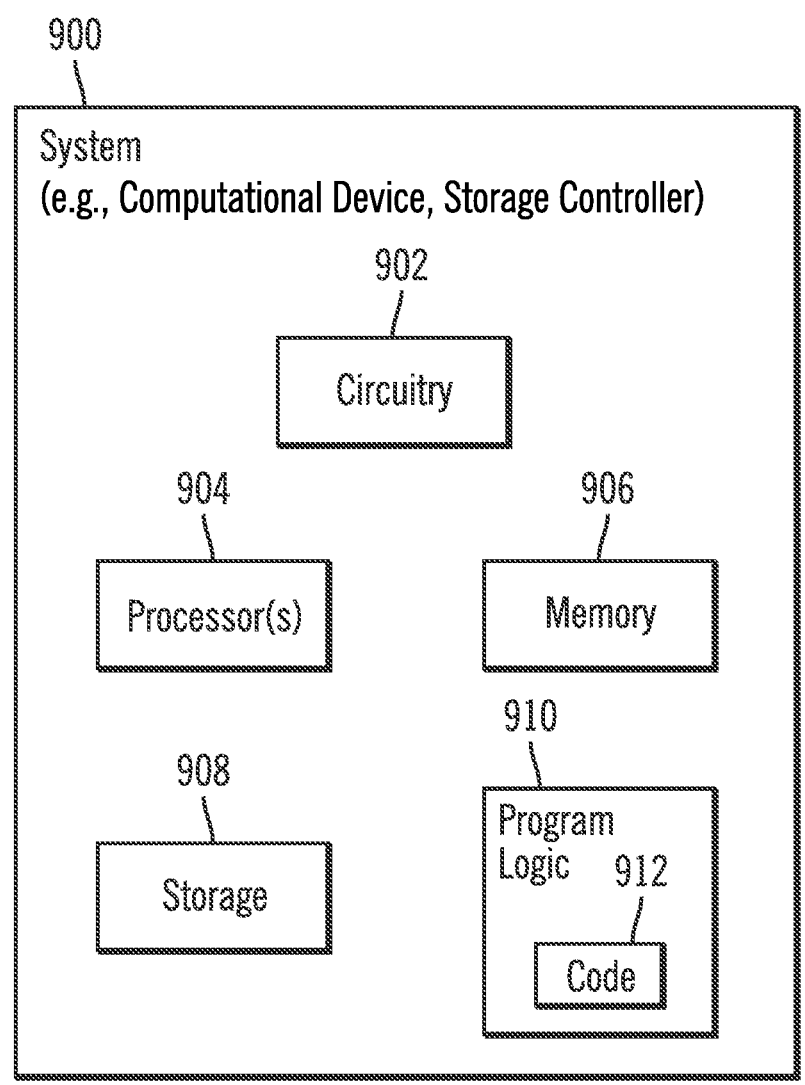
FIG. 9 illustrates a block diagram of a computational system that shows certain elements that may be included in the primary storage controller, the secondary storage controller, or the computational device shown in FIG. 1, in accordance with certain embodiments.

FIG. 9 illustrates a block diagram that shows certain elements that may be included in the storage controllers 102, 104 or the computational device 106 in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
   in response to receiving by a primary storage controller a notification that a secondary storage controller has data that is free of a virus, repairing a quarantined area of the primary storage controller to remove the virus; and
   in response to repairing the quarantined area of the primary storage controller to remove the virus, and in response to determining that data between the primary storage controller and the secondary storage controller are not in synchronization but are still consistent on the secondary storage controller, and in response to determining that updated data that contained the virus has not yet replicated to the secondary storage controller via an asynchronous replication, requesting by the primary storage controller to a host to resend data updates.

2. The method of claim 1, the method further comprising:
   subsequent to requesting by the primary storage controller to resend the data updates, indicating to a user that the quarantined area of the primary storage controller has been repaired.

3. The method of claim 1, wherein the primary storage controller is repaired to remove the virus by writing data recovered from the secondary storage controller into a new area of the primary storage controller and generating metadata updates to integrate the new area with an existing file, where the existing file is comprised of subfiles.

4. The method of claim 1, wherein the primary storage controller maintains metadata comprising:
   location of the quarantined area; and
   an indicator to indicate that the quarantined area has been recently repaired, wherein the quarantined area is recently repaired if it has been repaired within a predetermined period of time.

5. The method of claim 1, wherein a query to determine whether the secondary storage controller has data that is free of virus in an area of the secondary storage controller corresponding to the quarantined area of the primary storage controller is sent to the secondary storage controller if the quarantined area has not been recently repaired to avoid repeated queries of the secondary storage controller.

6. The method of claim 1, wherein the primary storage controller stores indicators indicating a number of times the quarantined area has been infected and a history of infections of the quarantined area, wherein based at least on the indicators the primary storage controller determines which hosts, applications or users are causing repeated problems with viruses.

7. A system comprising a primary storage controller, wherein the primary storage controller is coupled to a secondary storage controller, the system comprising:
   a memory; and
   a processor coupled to the memory, wherein the processor performs operations, the operations comprising:
      in response to receiving by the primary storage controller a notification that the secondary storage controller has data that is free of a virus, repairing a quarantined area of the primary storage controller to remove the virus; and
      in response to repairing the quarantined area of the primary storage controller to remove the virus, and in response to determining that data between the primary storage controller and the secondary storage controller are not in synchronization but are still consistent on the secondary storage controller, and in response to determining that updated data that contained the virus has not yet replicated to the secondary storage controller via an asynchronous replication, requesting by the primary storage controller to a host to resend data updates.

8. The system of claim 7, the operations further comprising:
   subsequent to requesting by the primary storage controller to resend the data updates, indicating to a user that the quarantined area of the primary storage controller has been repaired.

9. The system of claim 7, wherein the primary storage controller is repaired to remove the virus by writing data recovered from the secondary storage controller into a new area of the primary storage controller and generating metadata updates to integrate the new area with an existing file, where the existing file is comprised of subfiles.

10. The system of claim 7, wherein the primary storage controller maintains metadata comprising:
    location of the quarantined area; and
    an indicator to indicate that the quarantined area has been recently repaired, wherein the quarantined area is recently repaired if it has been repaired within a predetermined period of time.

11. The system of claim 7, wherein a query to determine whether the secondary storage controller has data that is free of virus in an area of the secondary storage controller corresponding to the quarantined area of the primary storage controller is sent to the secondary storage controller if the quarantined area has not been recently repaired to avoid repeated queries of the secondary storage controller.

12. The system of claim 7, wherein the primary storage controller stores indicators indicating a number of times the quarantined area has been infected and a history of infections of the quarantined area, wherein based at least on the indicators the primary storage controller determines which hosts, applications or users are causing repeated problems with viruses.

13. A computer program product, the computer program product comprising:
- a computer readable storage medium having computer readable program code embodied therewith, the computer readable program code configured to perform operations on a processor, the operations comprising:
- in response to receiving by a primary storage controller a notification that a secondary storage controller has data that is free of a virus, repairing a quarantined area of the primary storage controller to remove the virus; and
- in response to repairing the quarantined area of the primary storage controller to remove the virus, and in response to determining that data between the primary storage controller and the secondary storage controller are not in synchronization but are still consistent on the secondary storage controller, and in response to determining that updated data that contained the virus has not yet replicated to the secondary storage controller via an asynchronous replication, requesting by the primary storage controller to a host to resend data updates.

14. The computer program product of claim 13, the operations further comprising:
- subsequent to requesting by the primary storage controller to resend the data updates, indicating to a user that the quarantined area of the primary storage controller has been repaired.

15. The computer program product of claim 13, wherein the primary storage controller is repaired to remove the virus by writing data recovered from the secondary storage controller into a new area of the primary storage controller and generating metadata updates to integrate the new area with an existing file, where the existing file is comprised of subfiles.

16. The computer program product of claim 13, wherein the primary storage controller maintains metadata comprising:
- location of the quarantined area; and
- an indicator to indicate that the quarantined area has been recently repaired, wherein the quarantined area is recently repaired if it has been repaired within a predetermined period of time.

17. The computer program product of claim 13, wherein a query to determine whether the secondary storage controller has data that is free of virus in an area of the secondary storage controller corresponding to the quarantined area of the primary storage controller is sent to the secondary storage controller if the quarantined area has not been recently repaired to avoid repeated queries of the secondary storage controller.

18. The computer program product of claim 13, wherein the primary storage controller stores indicators indicating a number of times the quarantined area has been infected and a history of infections of the quarantined area, wherein based at least on the indicators the primary storage controller determines which hosts, applications or users are causing repeated problems with viruses.

* * * * *